United States Patent
Nizametdinov et al.

(10) Patent No.: US 9,491,061 B1
(45) Date of Patent: *Nov. 8, 2016

(54) ISOLATION OF OBJECTS REPRESENTNG SERVER RESOURCES IN BROWSER USING IFRAMES

(71) Applicant: Parallels IP Holdings GmbH, Schaffhausen (CH)

(72) Inventors: Timur Nizametdinov, Moscow (RU); Vladimir Grebenshikov, Moscow (RU); Vladimir Zatsepin, Moscow (RU); Evgeny Uspenskiy, Moscow (RU); Maxim Kuzkin, Moscow (RU)

(73) Assignee: Parallels IP Holdings GmbH, Scaffhausen (CH)

(*) Notice: Subject to any disclaimer, the term of this patent is extended or adjusted under 35 U.S.C. 154(b) by 0 days.

This patent is subject to a terminal disclaimer.

(21) Appl. No.: 15/175,291

(22) Filed: Jun. 7, 2016

Related U.S. Application Data

(63) Continuation of application No. 14/702,375, filed on May 1, 2015, now Pat. No. 9,398,017.

(51) Int. Cl.
*H04L 29/06* (2006.01)
*H04L 12/24* (2006.01)
*H04L 29/08* (2006.01)

(52) U.S. Cl.
CPC ............ *H04L 41/22* (2013.01); *H04L 63/083* (2013.01); *H04L 63/104* (2013.01); *H04L 67/02* (2013.01); *H04L 67/10* (2013.01)

(58) Field of Classification Search
None
See application file for complete search history.

(56) References Cited

U.S. PATENT DOCUMENTS

| | | | | |
|---|---|---|---|---|
| 8,825,855 B2* | 9/2014 | Feng | ............... | H04L 67/2814 709/225 |
| 9,398,017 B1* | 7/2016 | Nizametdinov | ........ | H04L 63/10 |
| 2010/0107218 A1* | 4/2010 | Kurien | ............... | G07F 7/0826 726/2 |
| 2013/0167028 A1* | 6/2013 | Goldman | ........... | H04N 21/4425 715/716 |
| 2014/0108095 A1* | 4/2014 | Tetreault | ............ | G06Q 30/0203 705/7.32 |
| 2014/0108601 A1* | 4/2014 | Larocque | ............ | H04L 67/306 709/217 |
| 2014/0181892 A1* | 6/2014 | Von Bokern | .......... | H04L 63/102 726/1 |
| 2014/0181893 A1* | 6/2014 | Von Bokern | ........ | H04L 63/0838 726/1 |
| 2016/0063669 A1* | 3/2016 | Wilensky | ............. | G06T 3/0093 348/578 |

* cited by examiner

*Primary Examiner* — Christopher Revak
(74) *Attorney, Agent, or Firm* — Bardmesser Law Group

(57) ABSTRACT

Method for web-based management of resources. On a cloud computing system, for groups of user resources, defining commonly managed subgroups. Accessing cloud-based control procedures of one subgroup using a dedicated communication channel. Control procedures reside on a server, and are visible with a single specified domain ID unique for the subgroup. Multiple domain IDs are used in one communication session. On the client, isolated windows for each domain ID contain graphical representation of local applications, and where applications of one window share local data and are connected to control procedures using the same domain ID. Managing user resources through control procedures that are controlled by the applications. Only one of the isolated windows is activated at any one time on the user's computer.

20 Claims, 16 Drawing Sheets

ISOLATION OF OBJECTS REPRESENTNG SERVER RESOURCES IN BROWSER USING IFRAMES

CROSS-REFERENCE TO RELATED APPLICATIONS

This application is a continuation of U.S. patent application Ser. No. 14/702,375, filed on May 1, 2015 (now U.S. Pat. No. 9,398,017), incorporated herein by reference in its entirety.

BACKGROUND OF THE INVENTION

Field of the Invention

This invention relates to a method for a universal interface for controlling Virtual Machines (VMs), Containers (Virtual Private Servers—VPSs), server-based applications and other isolated objects controlled by network users through a browser displaying multiple sub-windows.

Description of the Related Art

Providers have multiple applications running in different environments such as VMs, Virtual Servers, server-based application and other isolated objects. Currently there is no interface that can securely control and separate these applications from a central location. For example, VM resources, antivirus (AV) resources for the email, AV resources for the VM or container (separate from email), backup, payment store interface (e.g., to collect credit card data and permit purchase), Office 365 (or similar) resources and mailbox resources appear on the same browser page, the user can affect and modify these resources using any of the code of this page even if they are encapsulated into different sub-windows. In other words, any browser user (and any code running in that browser) has random access to all resources within any browser window and sub-window. This can result in loss of security for the objects and resources that interface to an iframe that should not be affected.

Accordingly, a method for secure operations with objects which require isolation and also with services and resources controlled by network is desired.

SUMMARY OF THE INVENTION

Accordingly, the present invention is related to a method for a universal interface for controlling of services and resources over network through browser that substantially obviates one or more of the disadvantages of the related art.

A generic universal interface description according to the invention is encapsulated or insulated into a code container. The container stores a special code (e.g., HTML) used by a browser with supporting code isolation technology. The browser can have several windows or code representation with established borders on one page or it can use window placeholders that overlap each other. Such windows have control elements or active iframe content defined in a generic form, but related to connected control entities. One example of such a container for generating such windows is an iframe. In spite of the fact that conventional iframes have limited functionality the following text will use the term "iframe" for both isolated windows on the user hardware display and for code that insulates certain interfaces in an isolated pool, which produces a required level of security according to the invention.

The applications' iframe and panel are placed on different domains. This provides for code isolation at a browser level. In other words, the code written inside the iframe does not interfere with the code of the main window. Thus, the user feels as if he were working in one window (i.e., viewing one page). The user simply sees a web page and does not even know that this page is a sub-page or a portion of a larger iframe. This provides a desired level of security—i.e. the resources are isolated from services and the application does not have a direct access to the resources.

In another embodiment, a method for universal interface for isolation of services and resources. On a computer, executing code for downloading a webpage in a browser, the webpage interfacing to a server through a unified interface for managing browser objects and server resources, the webpage including a plurality of iframes, such that each iframe is associated with an application running on a server, the application having a corresponding browser object. One of the browser objects is a control panel for managing the server resources, the server resources including server applications. One of the server applications includes at least one virtual environment. Displaying, on the webpage, a control panel for managing the server applications and for allocating the server resources. The iframes are isolated from each on a domain name level such that code in one iframe cannot affect code in another iframe without permission. Each application is associated with its own domain or sub-domain.

In another embodiment, a method for web-based management of user's resources. On a cloud computing system, for a plurality of groups of user resources placed in the cloud, defining subgroups of resources whose settings are commonly managed. From a user's computer, accessing cloud-based control procedures of one subgroup using a dedicated communication channel. The control procedures reside on a server, and are visible with specified domain ID single and unique for the subgroup on a cloud side. Multiple domain IDs are used in one communication session between the server and the user's computer.

On the user's computer, starting isolated windows for each domain ID that contain graphical representation of local computer applications placed on the user's computer, and where applications of one window share local data and are connected to the control procedures using the same domain ID. Managing user resources through the control procedures that are controlled by the applications. Only one of the isolated windows is activated at any one time on the user's computer. When a control procedure is controlled by several applications belonging to separate windows, a separate communication channels with a separate domain ID is established for each window.

A security token is given the rights to control resources of a particular application only for a certain account. Trusted relationships are established among the applications installed by a provider. The isolation, in accordance with the exemplary embodiment, takes place on the client.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED FIGURES

The accompanying drawings, which are included to provide a further understanding of the invention and are incorporated in and constitute a part of this specification, illustrate embodiments of the invention and together with the description serve to explain the principles of the invention.

Figure 12:
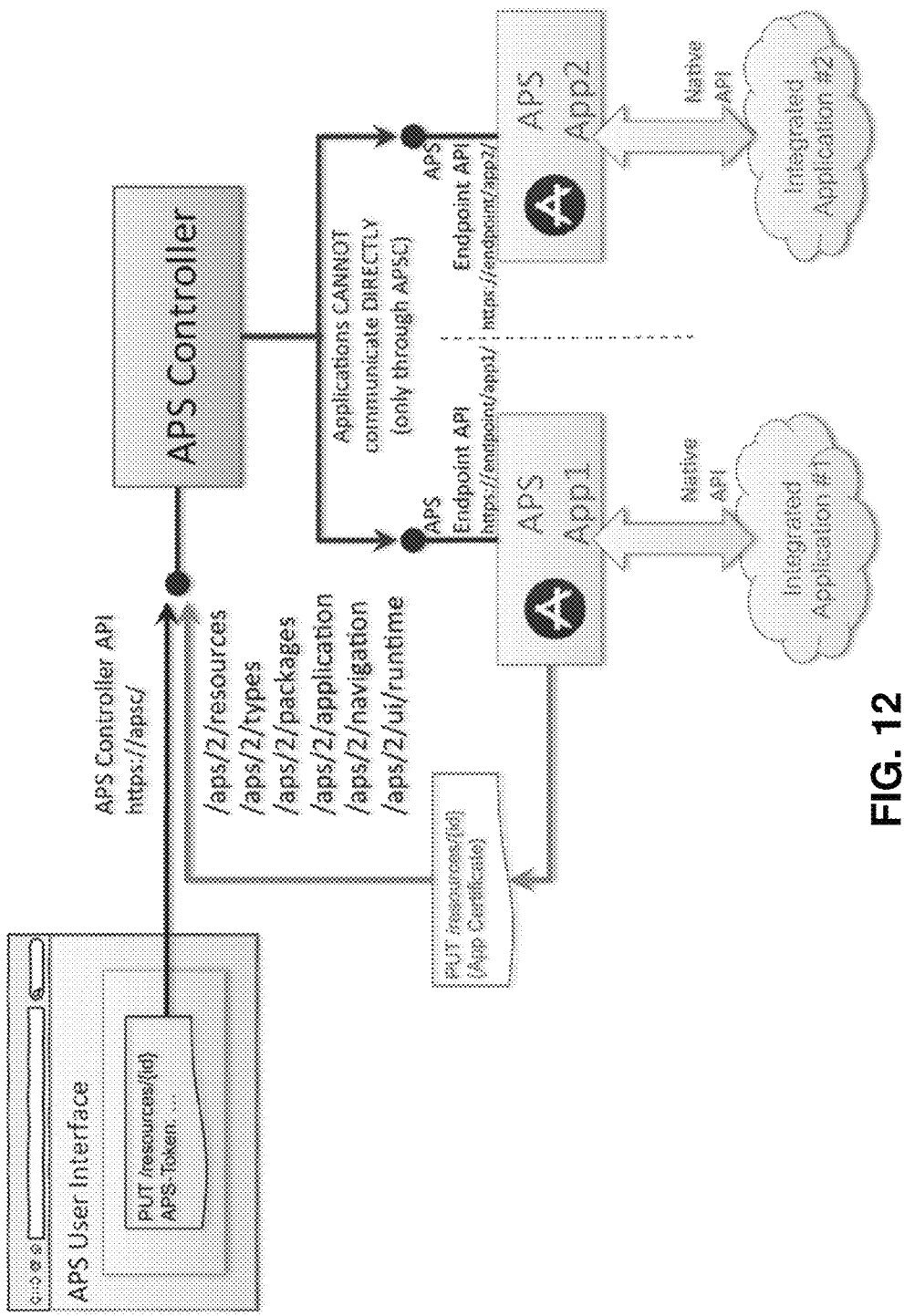
Figure 13:
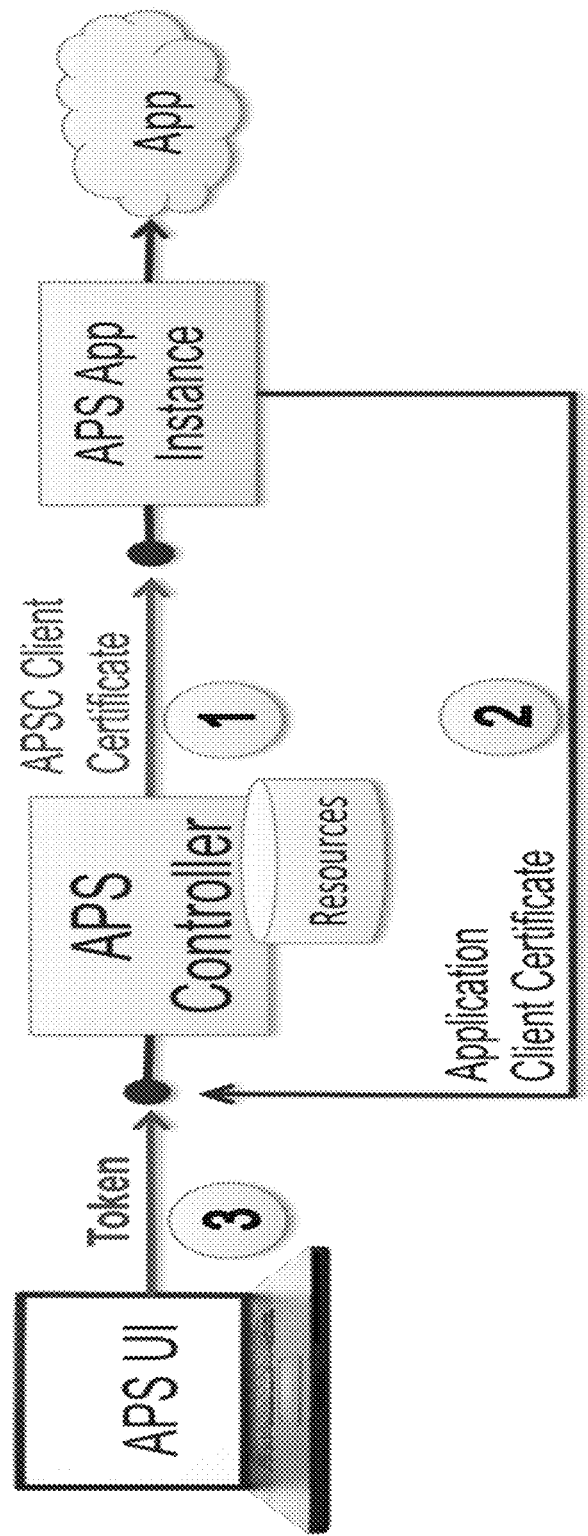
Figure 14:
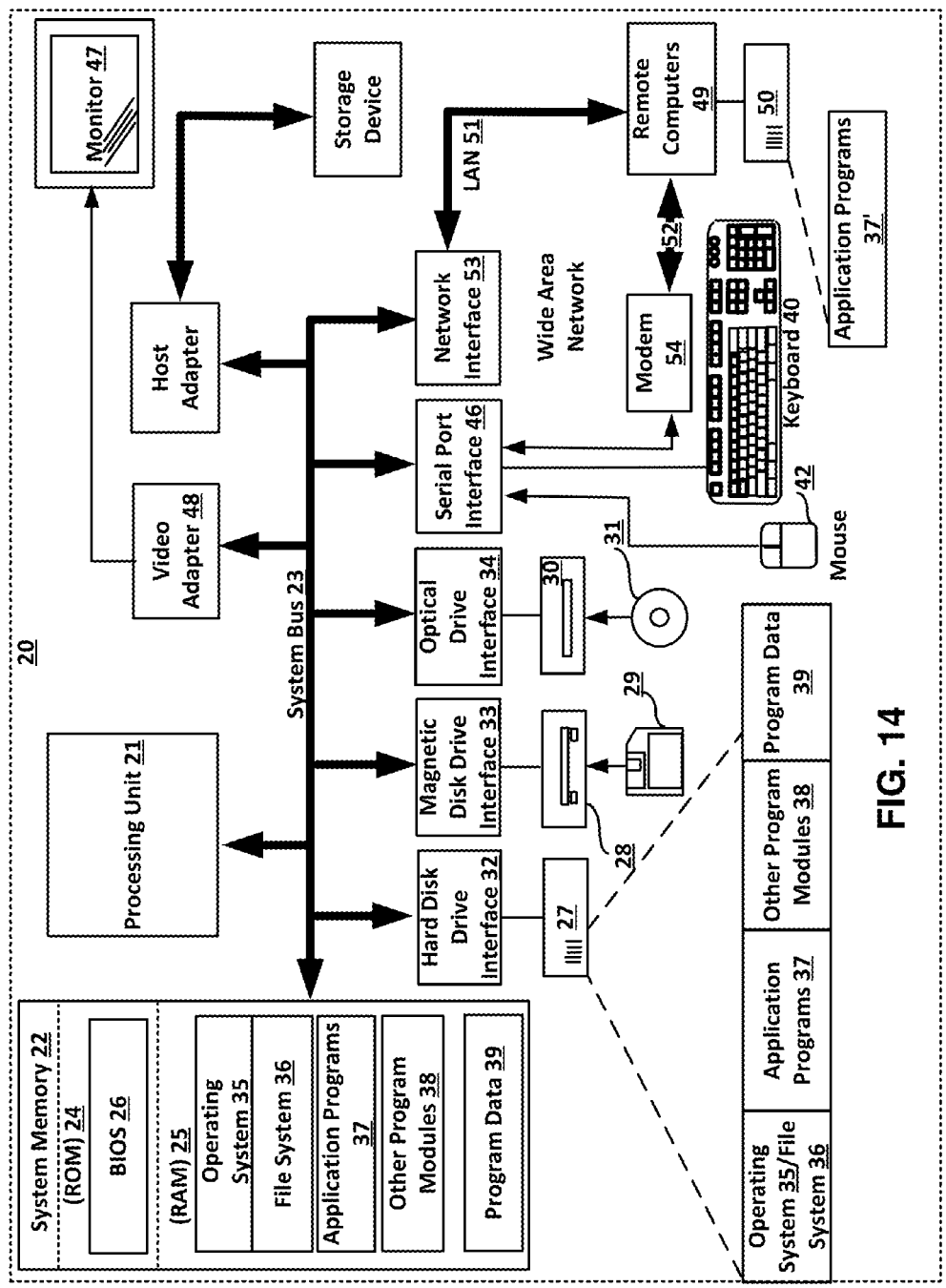

FIG. 12 describes secure relationships between active and passive content on the cloud remote from the user and user's browser;

FIG. 13 illustrates how the APS applications can request the APS controller (APSC) to operate resources in accordance with granted permissions;

FIG. 14 illustrates a schematic of an exemplary computer system (client or server) that can be used for implementation of the invention.

DETAILED DESCRIPTION OF THE PREFERRED EMBODIMENTS

Reference will now be made in detail to the preferred embodiments of the present invention, examples of which are illustrated in the accompanying drawings.

Virtual Machine (VM)—a type of an isolated Virtual Environment running on the same physical machine simultaneously, such as, for example, available from Microsoft Corp., VMware, Inc. or Parallels Software International, Inc. Each Virtual Machine instance executes its own OS kernel. Support of the VMs is implemented using a Virtual Machine Monitor and/or a Hypervisor.

Container (Virtual Private Server)—one type of a Virtual Environment running on the same hardware node with a single shared OS kernel and most of the system resources, where isolation of the Container is implemented on the namespace level. A container acts as an isolated virtual server within a single machine, where multiple sets of application services are organized on a single hardware node by placing each into an isolated virtual container.

The present invention is directed to a method for universal interface for isolation of services and resources controlled by network users through browser iframes. For example, mailbox application can control mail boxes or an application can control anti-virus settings and operations, but it cannot modify or delete VMs or containers, and it should not be able to modify other iframes (and their corresponding applications, objects and corresponding resources and services) without permission.

This isolation is provided across the board from a server code to the client code. This is implemented by separation at the iframe level. Each application runs on its own subdomain of the domain specified in the address bar. This guarantees that the application cannot access anything in another iframe from a different domain. The domain address specifies the application access rights on the server as well. All requests are encapsulated within the iframe located at a certain address.

Each iframe does not have access to other iframes or to the control panel, except when explicitly permitted. According to the exemplary embodiment, a generic universal interface description is encapsulated into a virtual environment (container/VPS or VM). The virtual environment stores a special code (e.g., HTML) used by a browser supporting iframe technology. The browser can have windows on one page or it can use window placeholders that overlap each other. The windows have control elements or active iframe content defined in a generic form but related to connected control entities.

For example, one application can create VMs and another application can create payment tokens. These applications need to be isolated so the application that controls the VMs or the mail does not interact with the application controlling the payment methods. Accordingly, the iframes can be called billing and service. Particular control elements are defined by a user and the environment. In one embodiment, when a browser (or an application) is unpacked, a semantic analysis of control elements built into the environment (i.e., container, VM or hosting system) is performed and the elements are grouped based on the semantic analysis.

If the placeholder does not have at least one corresponding element, the placeholder is not activated. According to the exemplary embodiment, each placeholder has to correlate to a certain security policy. For example, a resource visibility placeholder can reflect all resources of environments available to the user. The user authorizes himself to the system (using centralized authorization—e.g., Facebook authorization provides access to all his system resources). Note that when the resources are displayed, the iframe prohibits resources from controlling each other, control other system elements and request data from other resources.

In case if the requested by user information requires interaction of the resources for read operations, the iframe is created at domain level—i.e., the window reflects elements belonging to one domain. Resources interaction is possible when domain resource performs calculations or other processing of data. This approach provides for isolation of groups of resources of one user. However, domain association can be somewhat abstract including broadcasting of domain association. For example, resources of Apache servers can be isolated artificially.

Another authorization method is assigning to all resources a window of secure token. Display of the resources in the window is possible only after validation of the token. If the resources in the window have different tokens, some resources are deactivated or the entire window is deactivated. After the validation, the data exchange can be implemented over the ifame only using a secure protocol, such as SSH.

When the application is unpacked, the resources corresponding to the iframes are requested and the resources are grouped according to their domains. The security certificates of authorization centers are used. A starting page of the application is generated for the user and label is created. The user opens the placeholders sequentially acquires the information and controls the execution environments. In case when the interaction between the control elements for different placeholders is required, a new placeholder with corresponding rights is created.

According to the exemplary embodiment, applications' iframe and control panel are placed on different domains in order to provide code isolation at a browser level. The rights for controlling the resources of a given application are added to the security token for the given account. Trusted relationships between the applications are set by a provider.

Figure 1:
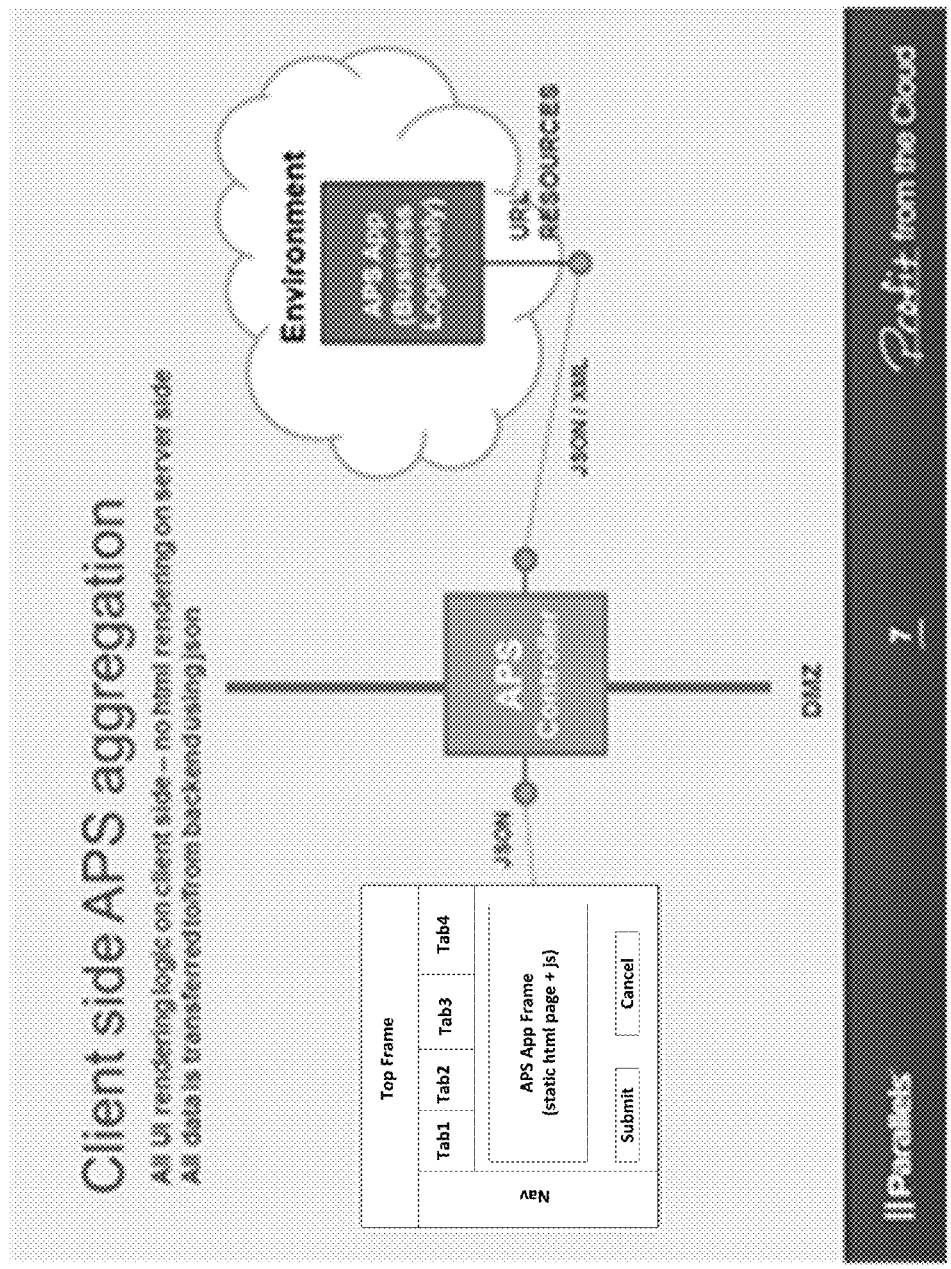
FIG. 1 illustrates an APS (Application Provisioning Standard) aggregation model, in accordance with the exemplary embodiment.

FIG. 1 illustrates an APS aggregation model, in accordance with the exemplary embodiment. The applications' iframe and panel are placed on different domains—i.e., isolated. Code from one iframe cannot affect code from another domain—i.e., if an AV runs in iframe 1, then malicious code in iframe 2 cannot tell the antivirus application to delete something or ignore something, since such a request would come from a domain with the wrong address. The APS application runs on the cloud. This provides for code isolation at browser level. A security token is given the rights to control resources of a particular application only for a certain account. Trusted relationships are established among the applications installed by a provider.

Figure 2A:
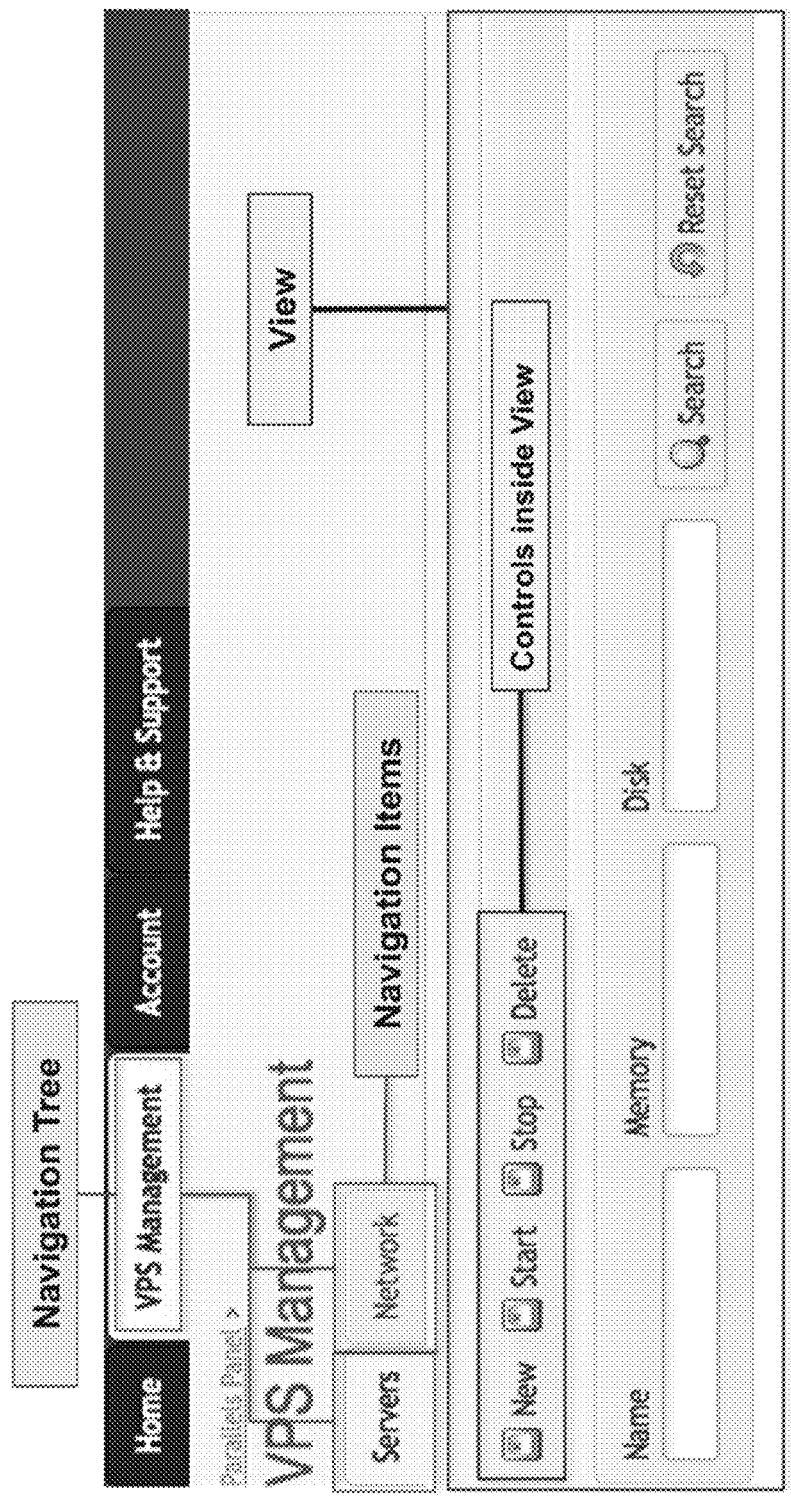
FIGS. 2A-2C illustrate the navigation tree VPS Management plugged into the customer CP.

According to the exemplary embodiment, APS (Application Provisioning Standard) allows creating custom user interface (UI) that can be plugged into different types of control panels (CPs), such as provider CP and customer CP. Each type of CP has its own placeholder (socket) to which the APS custom UI navigation tree can be plugged. In the example depicted in FIG. 2A, the navigation tree VPS Management is plugged into the customer CP.

Navigation serves as a switch between placeholders corresponding to browser sessions. Note that each tab in a browser can correspond to its own session, with its own set of security rules. The set of security rules for each iframe is a subset of the session security rules, and the session security rules are a superset of all the security rules for all the iframes that make up a browser tab. The security rule set may be different for different tabs.

All services are combined within one control panel, but the user should not experience any differences when working with different services—i.e., the tables are rendered in the same way and the navigation has to be the same, making operating with the different applications through the different iframes completely seamless. The navigation provides switching between views of different applications residing in different iframes rendered to the user. The menu elements are drawn by the control panel and displayed as placeholders. Note that navigation between menu items is separated from the contents displayed in the iframes. In one embodiment, this means that any action performed inside any iframe does not affect content outside the iframe border. And vice versa, the content of the iframe may be affected by only elements located inside the iframe. To protect a user against erroneous or malicious actions, the "inactive" or similar sign may be placed in a visible part of the iframe shown in the background in process of switching between iframes, for example. The control panel can draw these elements in a different manner at a later time. A user can switch between these elements while the iframe code is not affected. In other words, the navigation between the iframes is isolated from the content of the iframes. This makes the user interface very smooth (seamless) in terms of navigation.

In an APS package, the APS UI is presented by the following parts:

Metadata in the APP-META.xml file must define one or more navigation trees that can be plugged into specified placeholders (placeholders) of different control panels;

Each navigation tree contains one or more navigation items, that together make up the skeleton of the navigation tree;

Each navigation item may contain one or more visibility components. Visibility refers to displaying or hiding of navigation elements. For example, a screen can have several elements, but some of them are not shown. Each visibility is mapped to a screen in a CP. For example, AV elements placeholder and mailbox elements placeholder can be combined and shown on the same navigation map. However, if the user did not buy an AV component, the corresponding placeholder is made invisible. In a CP screen, the contents of a visibility is presented by an HTML file. The CP places a visibility marker inside an HTML iframe.

Normally, an HTML file contains HTML and JavaScript code that provide all necessary widgets to a user for managing application resources.

Figure 2B:
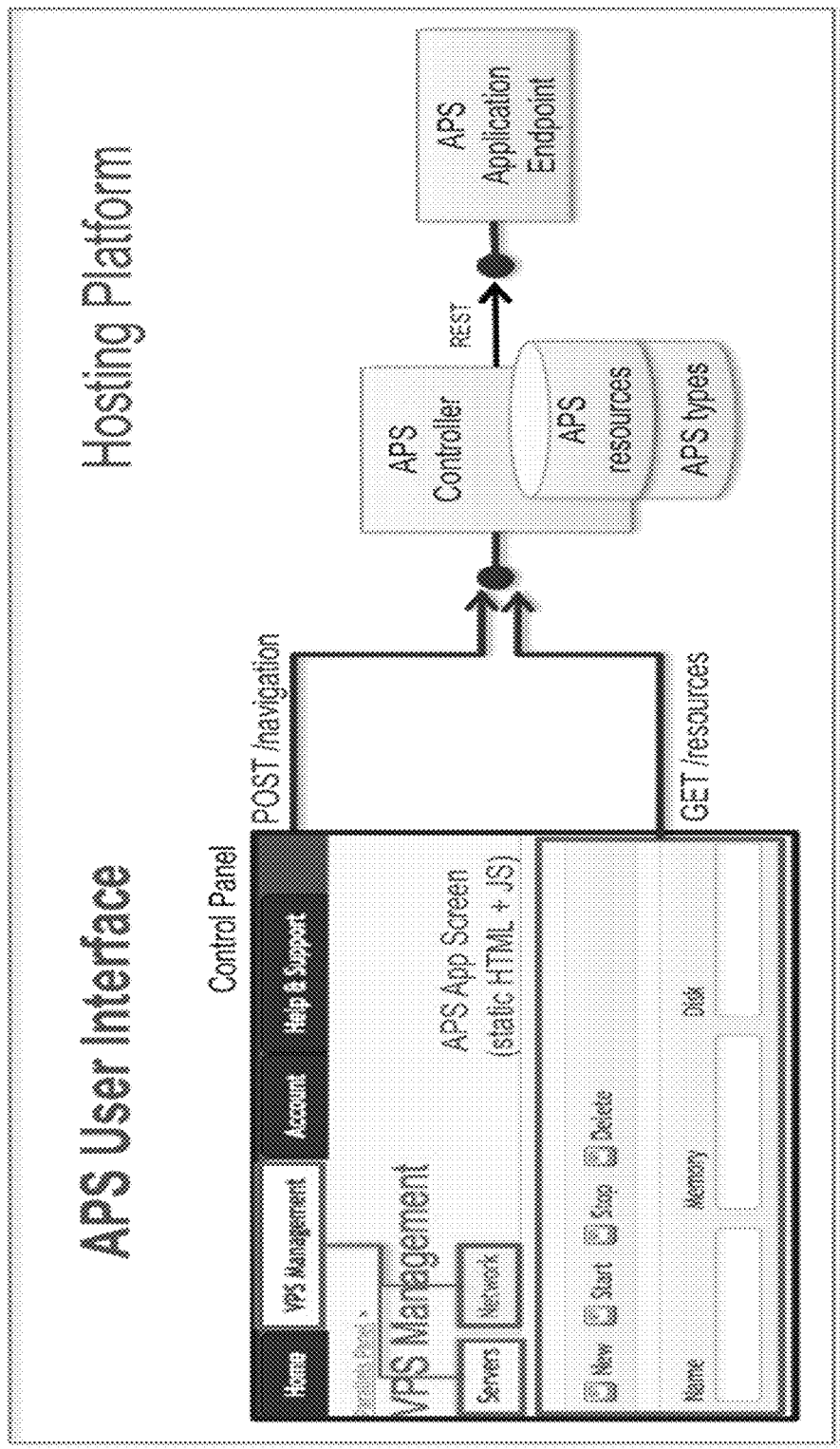

FIG. 2B illustrates how APS provides methods and tools for developing custom APS user interface (APS UI) that can be plugged into different types of control panels in Parallels Automation. APS JavaScript Software Development Kit (APS JS SDK) exposes a lot of JS objects that simplify the development process and make APS packages robust to hosting platform updates.

The entire simplified high-level APS UI architecture can be represented as shown in FIG. 2B. The exemplary architecture has the following key features:

All APS presentation logic is processed on the client side. There is no HTML rendering on the server side. A screen is rendered by a view component that is an HTML code with JS;

Navigation is described declaratively in the APS metadata and handled by a control panel;

All data is transferred to and from backend using REST requests in JSON format;

AJAX technology is used for asynchronous communications and for unloading the backend server from building web pages;

The backend server implements provisioning and security logic; and

HTML iframe is used to isolate a page inside its own container.

Figure 2C:
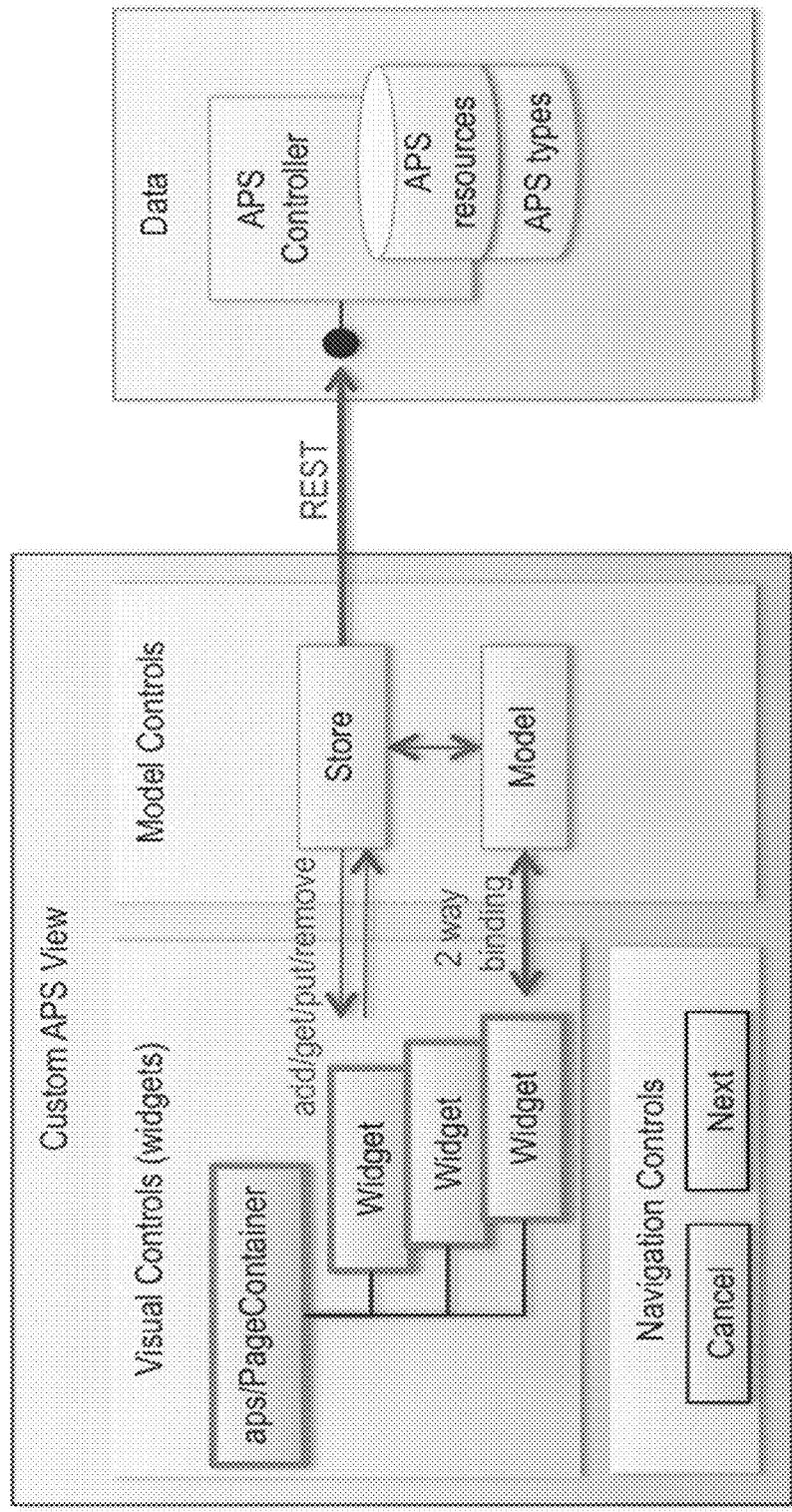

FIG. 2C illustrates an exemplary user interaction in accordance with the exemplary embodiment. In a screen, users may need to perform various operations with objects of different types, e.g.:

Creating objects;

Updating objects;

Listing objects and deleting objects in lists;

Monitoring and processing events that can happen with objects; and

View Components¶

A typical view may be built from several groups of control elements (controls). Visual controls are defined and processed by HTML and javascript code:

The APS/PageContainer control is the root element in a view that contains all visual controls. Only one PageContainer must be defined in the view;

Visual controls, or widgets, are inserted into PageContainer. They allow a user to perform all necessary operations with application resources;

Navigation controls, which are the Cancel, Previous, Next, and Submit buttons can be declared in the application metadata, but processed by the javascript code. The javascript code makes decision on where to navigate and which other actions to perform when a control is activated.

Model controls are used for effective management of data in the user browser and for interacting with the APS controller:

The Store control manages the asynchronous communication with the APS controller. It implements the REST operations: POST, GET, UPDATE, and DELETE.

The Model control, if bound to a widget, establishes the 2-way synchronization with the widget. If the widget value is changed, it will be synced with the Model. Usually, when navigating to another view, the javascript code takes care of syncing the Model with the Store control and saving the data in the APS database.

Figure 3:
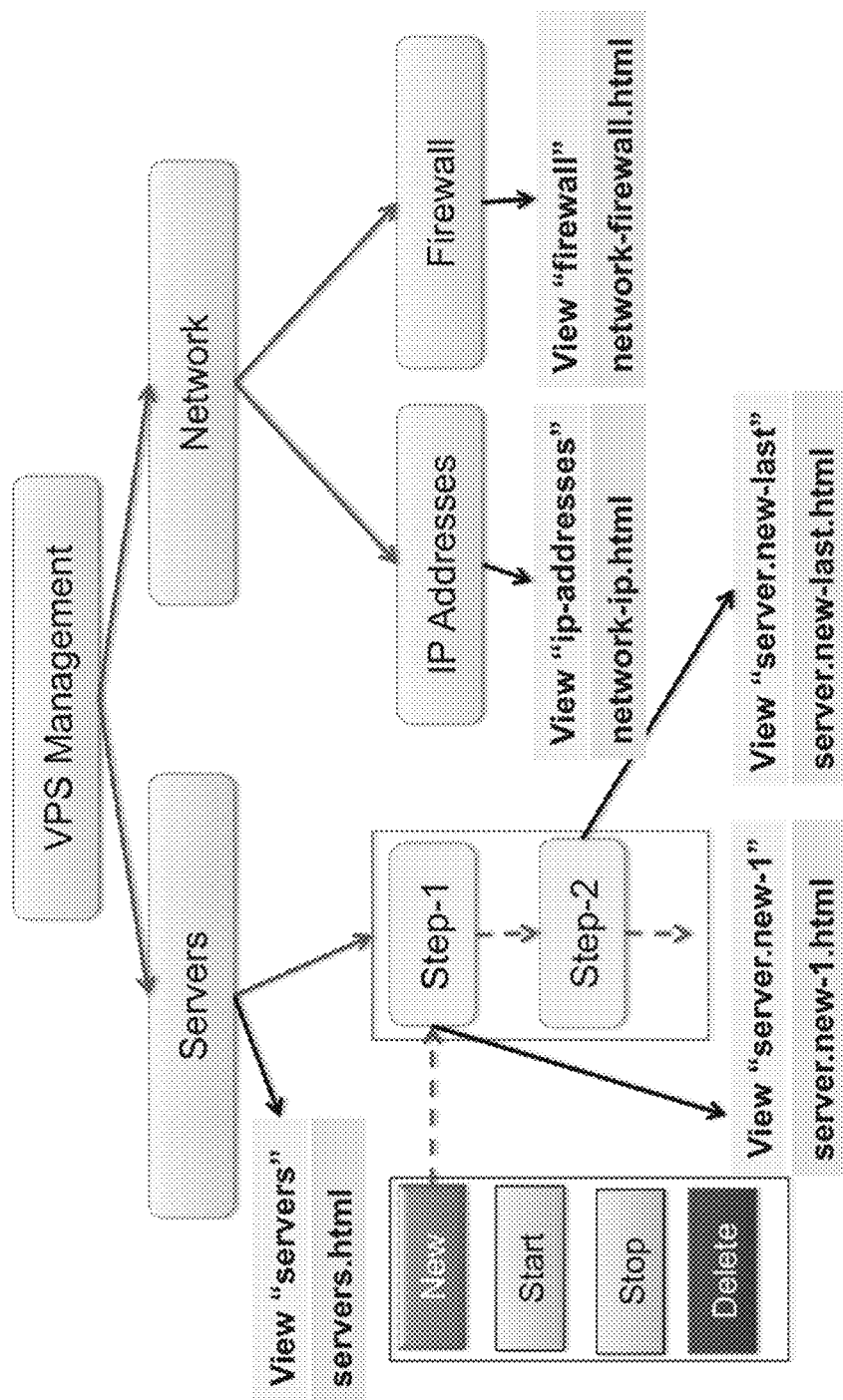
FIG. 3 illustrates an exemplary navigation tree.

A navigation tree "tells" a CP where a certain visibility must be embedded. APS UI can be represented by a navigation tree similar to the example depicted in FIG. 3. It contains a number of navigation items: Servers, Network, IP Addresses, and Firewall. The diagram also specifies visibilities in some navigation items and the HTML files implementing the visibilities. For example, the Servers item contains several visibilities:

The "servers" visibility displays a list of servers and provides the toolbar widgets implementing the New, Start, Stop, and Delete buttons. The servers.html file implements the visibility;

Since creation of a VPS, started from the "servers" visibility, may require more than one step, a separate visibility is declared for each step, e.g. "server.new-1" visibility is used at the first step. The server.new-1.html file implements the visibility. The same way, the other items and visibilities are implemented. The APP-META.xml file defines all needed navigation trees.

Figure 4:
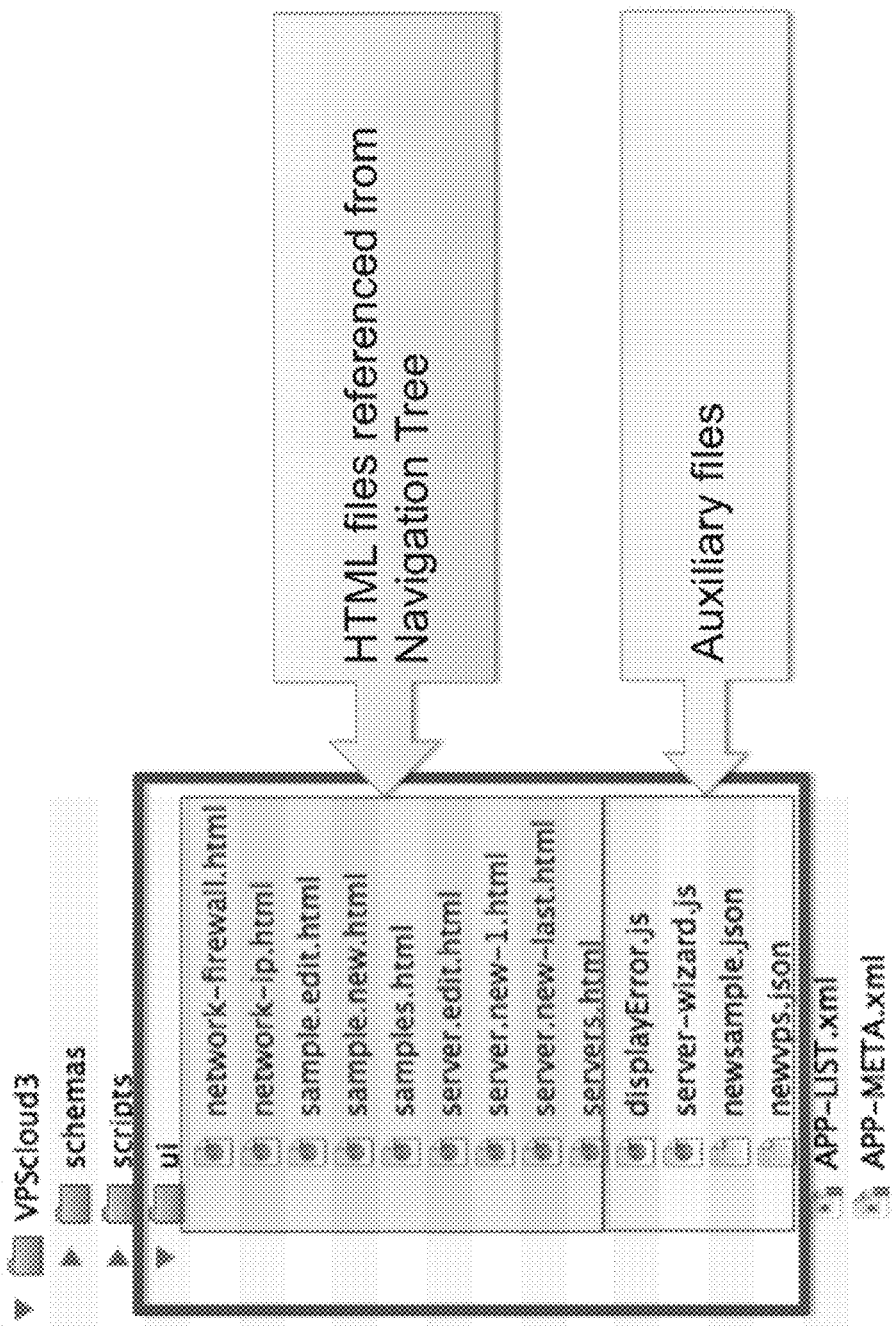
FIG. 4 illustrates an example of how visibility HTML files and all auxiliary files are collected in the UI (universal interface) folder of an APS package.

The visibility HTML files and all auxiliary files are collected in the UI folder of the APS package as presented in the example depicted in FIG. 4.

In a CP, an APS UI visibility is embedded into an HTML iframe through a special object called visibility context, which structure is presented in the example provided in the Appendix i.

The objects defined in the visibility context are available for the JavaScript code in the visibility file. For example, the varName1 variable is available as aps.context.vars.varName1. Note that the aps.context object is available in a visibility file if the aps.ready! object from the APS JS SDK is required in the file.

A system control panel embeds an APS navigation tree and renders a selected visibility using several steps outlined below:

1. Get the request parameters:
Visibility ID;
Resource ID;
Visibility parameters.
2. Send a POST request to /aps/2/navigation with request parameters;
3. In the response, get the JSON representation of the current screen—menu items, visibility, and representations of resources declared by variables in the navigation section;
4. Render item elements as menu elements. For example, in the PA Customer CP, a navigation item is presented by a tab;
5. Initialize the aps.context JS object with the security token, navigation variables, locale, etc. This object will be passed to the target iframe and parsed by the aps/ready! plugin.
6. Render the selected visibility element as an iframe using the aps.hub.createManagedHub method:
aps.hub.createManagedHub("https:// . . . /aps/2/packages/<package id>/ui/myVisibility.html", mashupAreaDiv)

Figure 5:
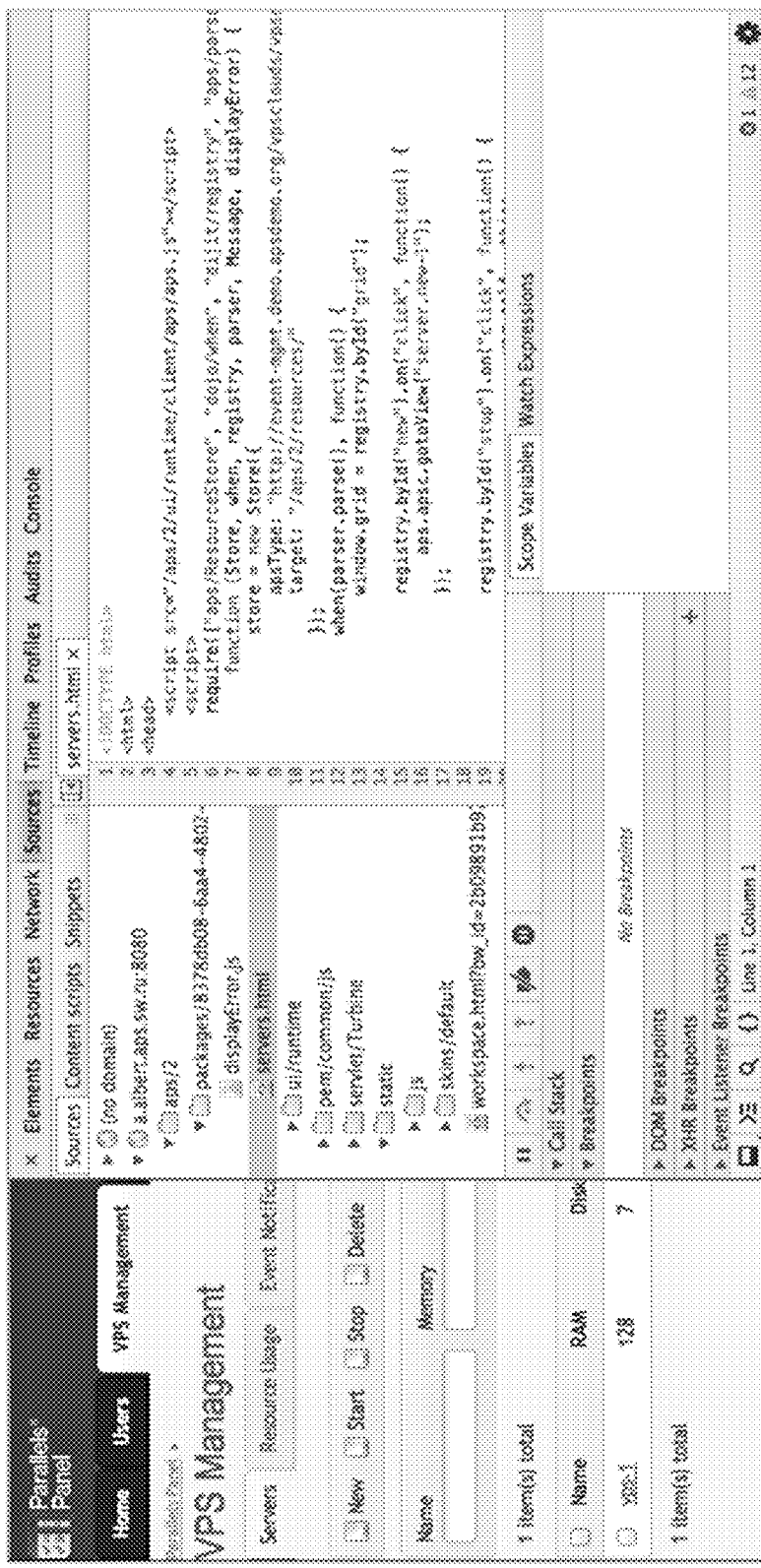
FIG. 5 illustrates a screen shot with a code that is normally hidden from a user.

FIG. 5 illustrates a screen shot with a code that is normally hidden from a user. In the screen-shot depicted in FIG. 5, the servers.html file and the required by it the displayError.js file are included into the iframe. The code on the right depicts what the actual page does for configuration of a browser. This code isolated from the UI placeholders on the left. In one embodiment these placeholders work as different entities based on different security rules while having the same visual representation. Additionally control objects can be used in different browser sessions using different channels.

The use of APS permits backend and UI integration of different distributed services (semantically bound) with the following capabilities:

(1) unified lookup engine using multiple inheritance, and unified sockets containing security descriptors and description or indication of interface on the client (browser) side;

(2) automatic provision/unprovision flow (e.g., a user can create a VM and physical server will be created automatically using depend-resolving mechanism). If a separate object had been created during session, the iframe was opened with isolated content inside it;

(3) common data cache(database) with runtime generated schema used by different services/apps. A new table or emulation of a new table in a database is created for each iframe or isolated window. This is different from Relational Database Management Systems, where a schema is defined at "compile-time", and NoSQL databases where schemas are not defined at all.

(4) UI engine that aggregates services seamlessly with following features:

(i) Common and consistent user experience. A limited set of control representations can be used. Each set of controls works with an isolated database table.

(ii) security isolation—each application is isolated inside its own sandbox (iframe and different domains—leveraging same origin policy, security tokens that allow to isolate data). One security token works inside only one frame. If the server side contains the application used in different frames, then several instances are created, or several sessions with one application are established.

Figure 6:
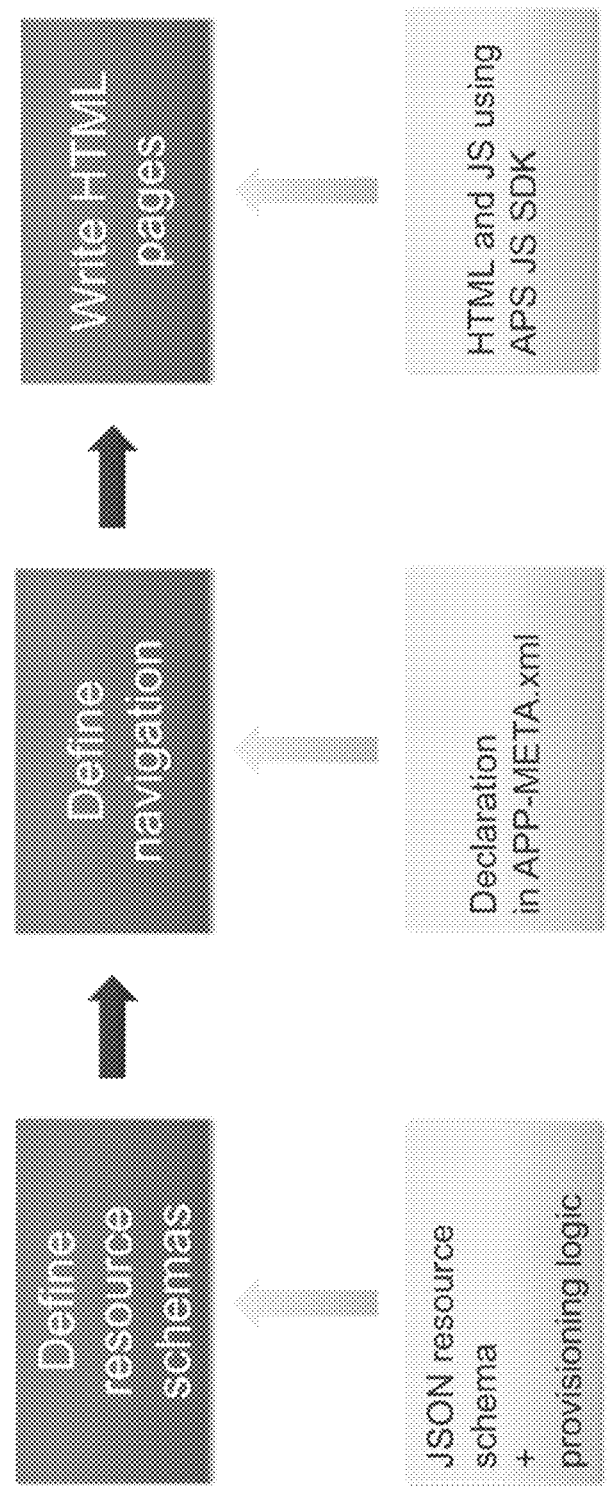
FIG. 6 illustrates three steps required for development of the APS custom UI for an application.

According to the exemplary embodiment, development of the APS custom UI for an application requires the following three steps depicted in FIG. 6:

Define JSON schemas for all resources that the UI will manage;
Define the static UI navigation tree in the APP-META.xml file of the APS package; and
Create HTML files with HTML and javascript codes. Each visibility defined at the previous step must be implemented by an HTML file.

Figure 7:
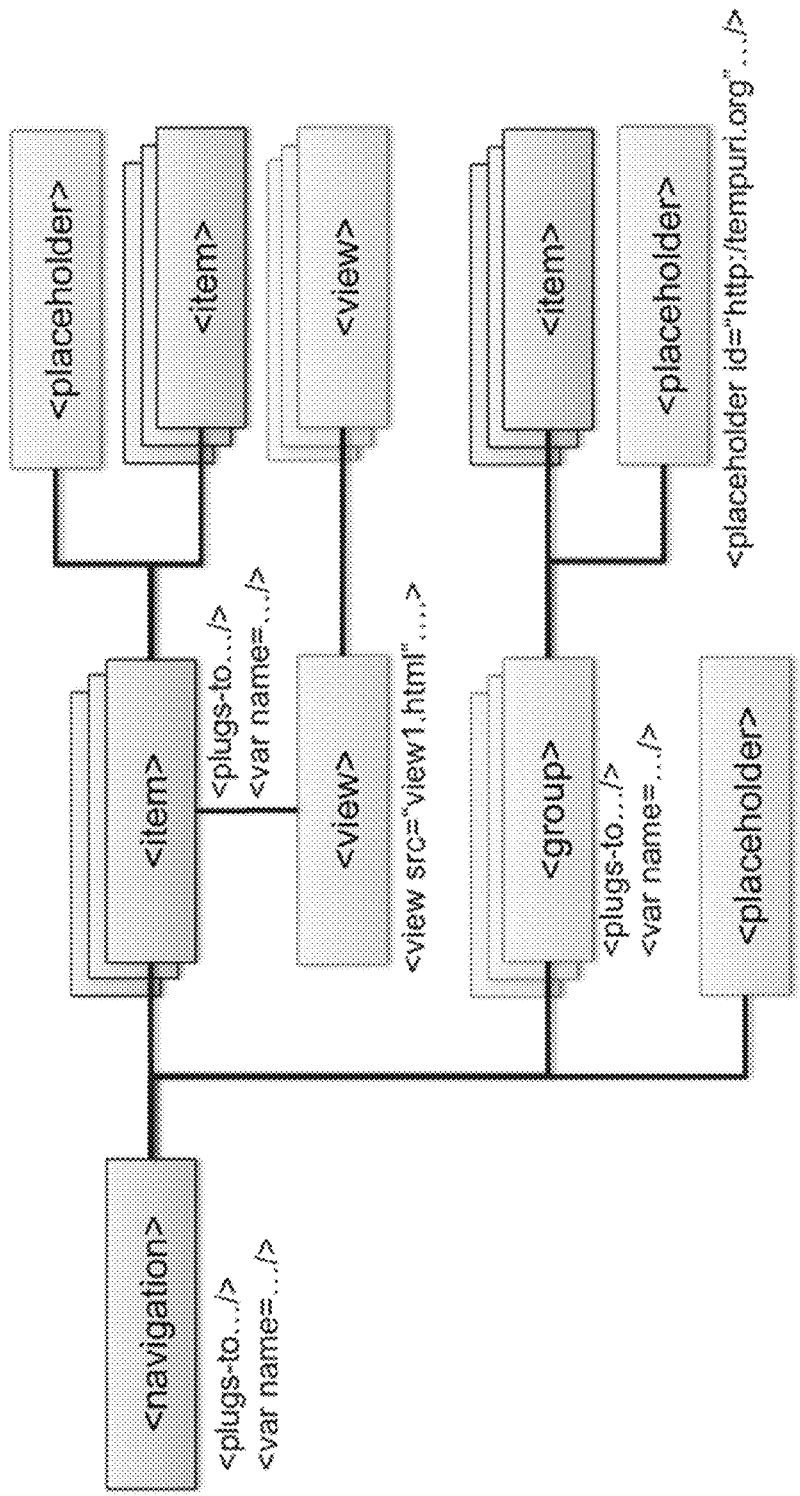
FIG. 7 illustrates how control panel (CP) allows a user to navigate to any visibility specified in the navigation tree.

According to the exemplary embodiment, a control panel (CP) allows a user to navigate to any visibility specified in the navigation tree as shown in FIG. 7. There are two navigation approaches:

Static navigation is declarative, as the navigation tree is declared in metadata of the APS package.

The tree is built based on different types of navigation elements:

(a) Navigation is the root element in the tree. The element declares it. Different types of CP can visualize this element differently. For example, in a Parallels™ Automation CP, when using an APS predefined placeholder, it is represented by a top level tab.

(b) Item creates a tree branch by means of the <item> element. An item is bound to the element or to another item, its parent. The element and several <item> elements create the tree skeleton. There are no loops in the tree. In a CP, an item is visualized as a tab.

(c) Visibility corresponds to a screen in a CP. A <visibility> element defines a navigation visibility and it is bound to an item or to another visibility. The one that is bound to an item will be activated when the item tab is selected in a CP.

(d) Group is similar to an item. The only difference is that it is not visualized. One can use it to group some items in order to assign the same variable for them or plug them to a certain placeholder.

(e) Placeholder reserves a place where navigation elements of other applications can plug to. It must have a unique ID in the form of URI. To plug a navigation element to it, the <plugs-to> element must refer to the placeholder ID.

Dynamic navigation is important, as it implies navigation from a visibility to another visibility by calling a navigation method and specifying the destination visibility ID. It is possible to use two different types of dynamic navigation:

Single page navigation is available only in next CP. In this case, only one iframe is used for all visibilities. Each visibility is implemented as an APS widget loaded in the iframe by the aps.apsc.gotoVisibility( ) method.

As an option the content of the iframe being downloaded once stays loaded on the local computer and stays the same while reloading the whole web-page containing the certain iframe or iframes. —Navigation within multiple pages is based on using a separate HTML file for each visibility. When navigating to a visibility by calling the aps.apsc.gotoVisibility( )method, another iframe is loaded with the required visibility.

According to the exemplary embodiment, the navigation process is based on the following principles:

A navigation tree may have unlimited number of layers built by means of linked navigation items. In APS implementations, the number of layers can be limited;

Each visibility can play its own role: for example, one represents a resource in general, another shows a list of resources, one more provides an interface to create or edit a resource;

A navigation element is the parent of all navigation elements that are linked with it and placed on the lower layer of the tree. They are linked by the parent-child relation;

A call for a visibility is processed by CP. It generates the context (or visual context) structure containing definition of the visibility and all its parents up to the root of the tree. Then, it activates the HTML/JS file implementing the visibility in iframe and passes the visual context to its JavaScript environment.

In any navigation element, it is possible to define variables that can be used by JavaScript (JS) or another code implementing a visibility. The variables are included into the context structure.

A navigation element can allow other trees or tree branches to plug into it. Therefore, it must declare itself as a <placeholder> with a unique ID.

A navigation element with the branch below can it be plugged into a placeholder, if it contains the <plugs-to> element referring to an existent placeholder ID.

According to the exemplary embodiment navigation can present several problems that are solved by a proprietary RESTful API (/navigation):

unification of navigations from different applications;
dynamic calculation of values of variables; calculation of values of attributes according to expression language and providing the variable into screen context;
combining steps of wizards from different applications, switching between the steps of different applications and creating a final summary screen;
replacement of existing navigation.

The purpose of the API is to implement a simple logic of navigation of APS2 in the panels. Only the navigation primitives that a panel can draw based on context are returned. The context can represent a selected screen plus a stack of selected resources. A set of such primitives produces a "cross section" of the navigation. The attributes (item, visibility, wizard) in the navigation primitives will be already calculated. The panel performs the rendering function (e.g., item→tab, visibility→iframe, wizard→group of screens with a corresponding header).

The API parameters can be divided into two sections:
panel parameters (e.g., depth of penetration of placeholders (tabs));
parameters defining a context of navigation: selected visibility—selected item—requested placeholder—stack of resources.

A basic URL—navigation is used. This URL contains the entire navigation tree available to the user according to subscription.

According to the exemplary embodiment, a controller navigation API is implemented on node.js (a server that allows for writing write a navigation code in JAVA script) for emulation. The API monitors system resources, detects new resources and resource quotas being exceeded. The API also refreshes or hides a control element in a new control panel. Note that only visible control elements can be used by the user. All the client-side traffic can go through the same bus, so the Navigation API can control all resources. The provider can disconnect an application from all other applications, if it finds out about a bug or critical vulnerability.

According to the exemplary embodiment, the size of the browser page is automatically adjusted based on the content of the iframe. The content of the iframe is constantly monitored in order to adjust the size of the browser page. Scrolling can appear on the page if necessary, but the user does not see any scrolling in the iframe window—it just changes its size for better user experience.

In order for the application to work, it is necessary that APP-META.xml aps2 of the application has a navigation section. All declared in the navigation variables has to be accessible. APP-META.xml of the application is located in directory /usr/local/pem/APS/packages/<package ID>. In order to find the packet id a size of a zip file with application name can be compared against other zip file. If the sizes match, it means that this is a copy of the application and the id can be determined.

A first request has to be {"placeholder":"http://www.parallels.com/pa-ccp/1#top"}+APS-Token. In order to check the requests, the plugin PostMan for Chrome can be used. The headers are APS-Token:1, Content-Type:application/json. The application parameters are:—port <PORT>—port used for listening by the application, default 9998—base URL <URL>—base URL for controller, default http://localhost:8080/aps/2.

According to the exemplary embodiment, the navigation elements are:
placeholder, plugs-to a position which indicates a place where the navigation is inserted (i.e., parent element) and how to replace the placeholder by a parent element. A control service for VMs, containers, mailboxes, file sharing, etc. can contain several windows encapsulated in different control elements using different navigation. The plugs-to mechanism provides for merging different navigation trees (for example a VM control tree and a backup management tree) using the placeholders. The resulting merged tree is rendered in the control panel. If several navigation elements need to be inserted in the same placeholder, the navigation is inserted sequentially. If a parent element placeholder (<plugs-to operation="replace-parent"), the parent element has to be replaced by the parent plugs-to. If several applications replace the same placeholder, an exception must be raised.

a var (variable) element declares "requirement" for existence of an instance of a resource of a certain type. Note that each variable is located in its own visibility field reflecting resources required by applications (e.g., a list of VMs, a list of containers/VPSs, a list of mail boxes, a list of antivirus services, file sharing resources, etc.). This provides a required security of the resources. The variables are available within the iframe and can be used by a backup agent, for example. If the resource, the VPS and the backup agent contain the variable with the same name "my resource."

After the navigation merge, an ambiguity can arise. According to the exemplary embodiment, the application is isolated at variable level as well, in order to resolve ambiguity. Thus, the variables only work in the context of a given application navigation tree. Note that read is performed over the navigation channel as well as over a direct access to APS bus channel, while write is performed only over the APS channel. Thus, the common channel can be used for all tabs used for reading.

Each navigation element implicitly points to its own visibility field. In the visibility field all variables of this field are visible along with all variables in all parent visibility fields only within a corresponding navigation element of navigation. The values of variables are global (for a given request) and are defined by the context provided with the request. In case the resource cannot be found in the context, a search of resource of the given type is performed in the user account (i.e., a corresponding APS-Token). If more than one resource is present, an error is generated.

Figure 8:
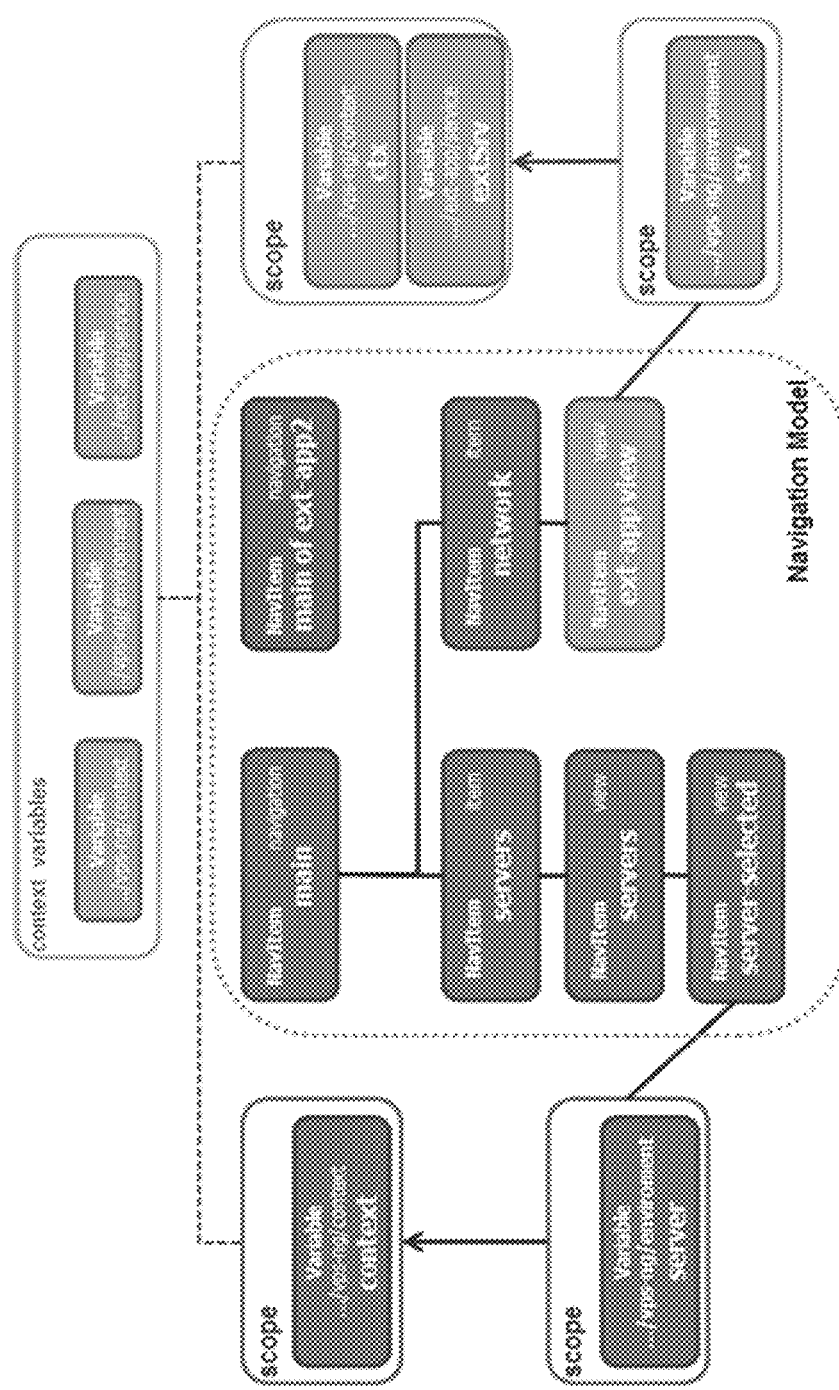
FIG. 8 illustrates a navigation model in accordance with the exemplary embodiment.

A navigation model is depicted in FIG. 8. All navigation elements are inherited from a base type NavItem (Navigation, Item, Visibility). The navigation is represented in the memory as a tree. Two types of references (parent, children) are needed for convenience of using the tree. All NavItems are related to each other as 1:n. Each NavItem can contain several variables. Each item represents variable scope. The scope (a visibility field) defines a set of available variables. The variables within the scope are combined with the parent ones.

When a model is calculated, the variables available to the given navigation element are used. Only the variables of a type that corresponds to or inherits the type within the visibility field of the navigation element are available. Names of the variables in the expressions sent in JavaScript correspond to the name of variable in the visibility field of the navigation element.

According to the exemplary embodiment, the navigation is implemented as follows:

1. Acquire IDs of all applications available by the given token (DB);
2. Receive representation of a navigation model of each of the received applications in the memory (i.e., representation of navigation of application);
3. If available in cache, take it from the cache. Otherwise, disassemble the navigation section in APP-META (if necessary, disassemble the entire APP-META);
4. Index all navigation elements (dictionaries/maps) from the section by key id. The index must be global (e.g., placeholder and plugs-to);
5. Create a universal static model:
   a. Find all representations of navigation, having plugs-to elements with the same ID as in the received placeholder id request;
   b. Unite the above into a common list by creating a tree of references to the model elements (parent, children, src—a reference for presenting a navigation built in the previous step);
   c. Begin going through navigation elements for each of navigation representations;
   d. Take a set of placeholder(s) for navigation element;
   e. Take placeholder(s) for navigation element;
   f. Find plugs-to elements corresponding the placeholder (with corresponding id);
   g. Check for possibility of insert/replace (see above);
   h. If the operation in plugs-to is omitted or operation="insert", insert parent plugs-to as a child of the placeholder with the same id of corresponding navigation element; a deep copying of the elements except for variable scope is performed;
   i. If the operation="replace-parent" of the placeholder by a parent of plugs-to with the same id;
   j. In case of insert or replacement, it is necessary to begin a pass through inserted navigation elements. Thus initial data is mutable;
   k. Index resulting static model by id (visibility, item, wizard).
6. Build a dynamic model consisting of static elements, dynamic navigation elements and screens (visibility).
7. If the visibilityID is provided, find in the static model corresponding navigation element (by index);
8. Start building new context (stack visibilityId, resourceId);
9. Add as a last context element provided with the request visibilityId, resourceId;
10. Build static navigation elements (tabs);
11. Build dynamic navigation elements (i.e., navigation elements that replace screen content);
12. Build visibility elements. If the visibility included into wizard—return the entire wizard.

Figure 9:
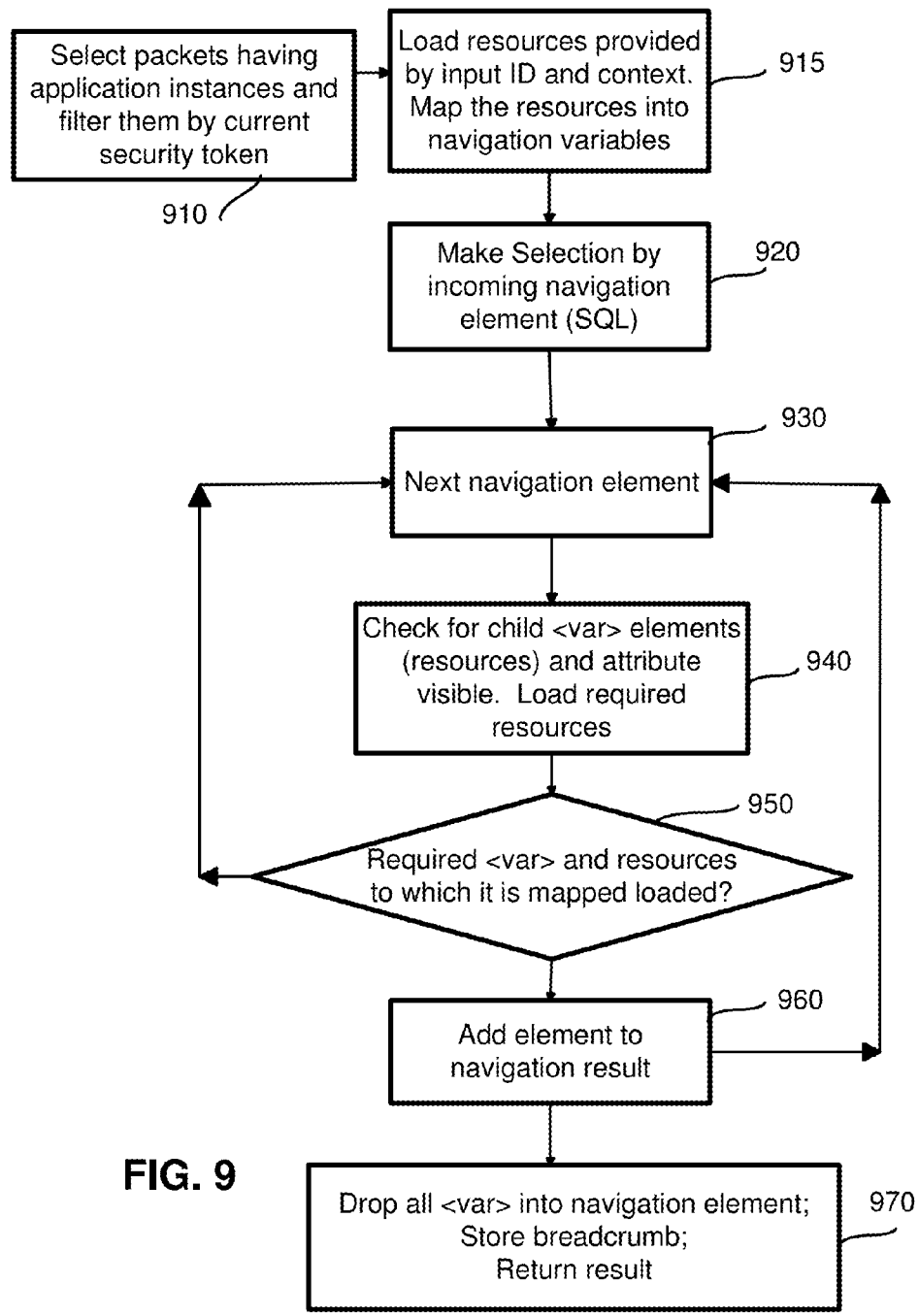
FIG. 9 illustrates a flow chart of navigation in the controller.

FIG. 9 illustrates a flow chart of navigation in the controller. In step 910, the process selects packets having application instances and filters them by current security token. In step 915, the process loads resources provided by input ID and context. Maps the resources into navigation variables. In step 920, the process make selection by incoming navigation element (SQL). In step 930, the process moves to next navigation element. In step 940, the process checks for child <var> elements (resources) and attribute visible. Loads required resources.

If required <var> and resources to which it is mapped loaded in step 950, the process adds element to the navigation results. Otherwise, the process moves back to step 930. In step 970, the process drops all <var> into navigation element; Stores breadcrumb—a navigation element for VPS management (see FIG. 5); Returns result.

Figure 10:
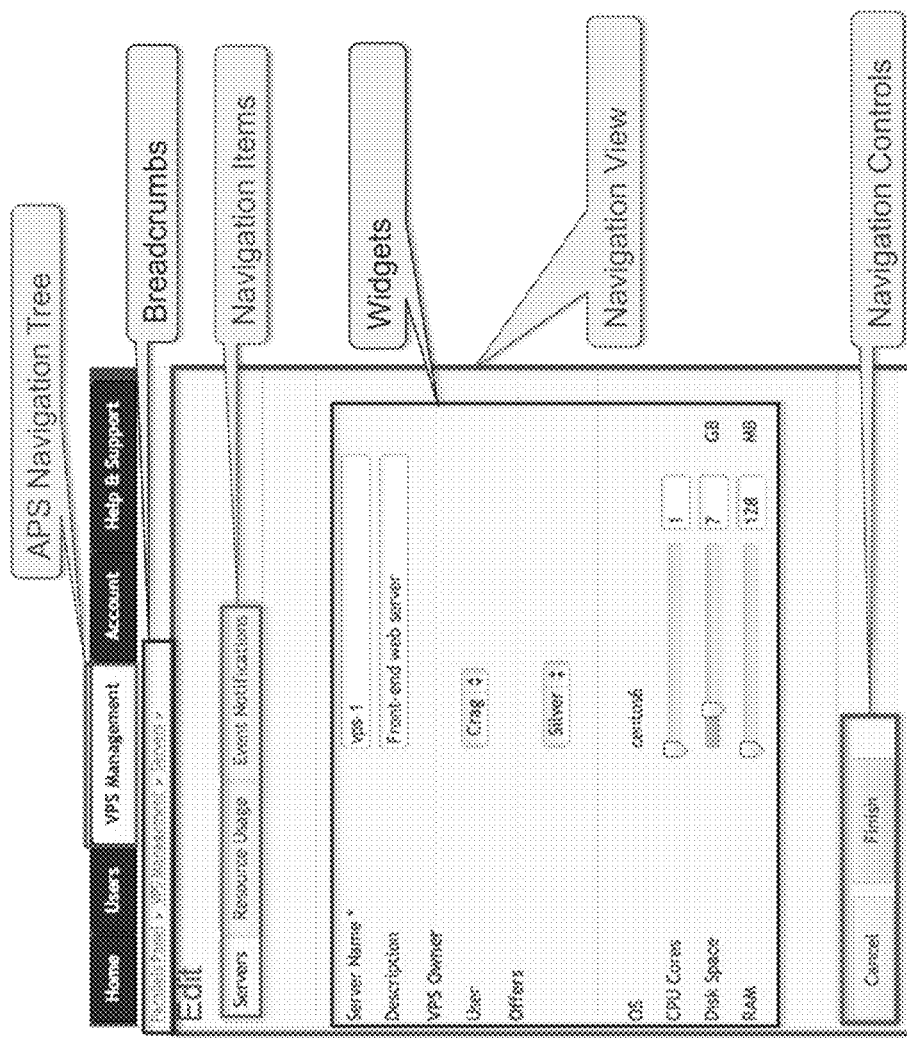
FIG. 10 illustrates detailed components of a web-panel.

FIG. 10 illustrates detailed components of a web-panel.

Figure 11:
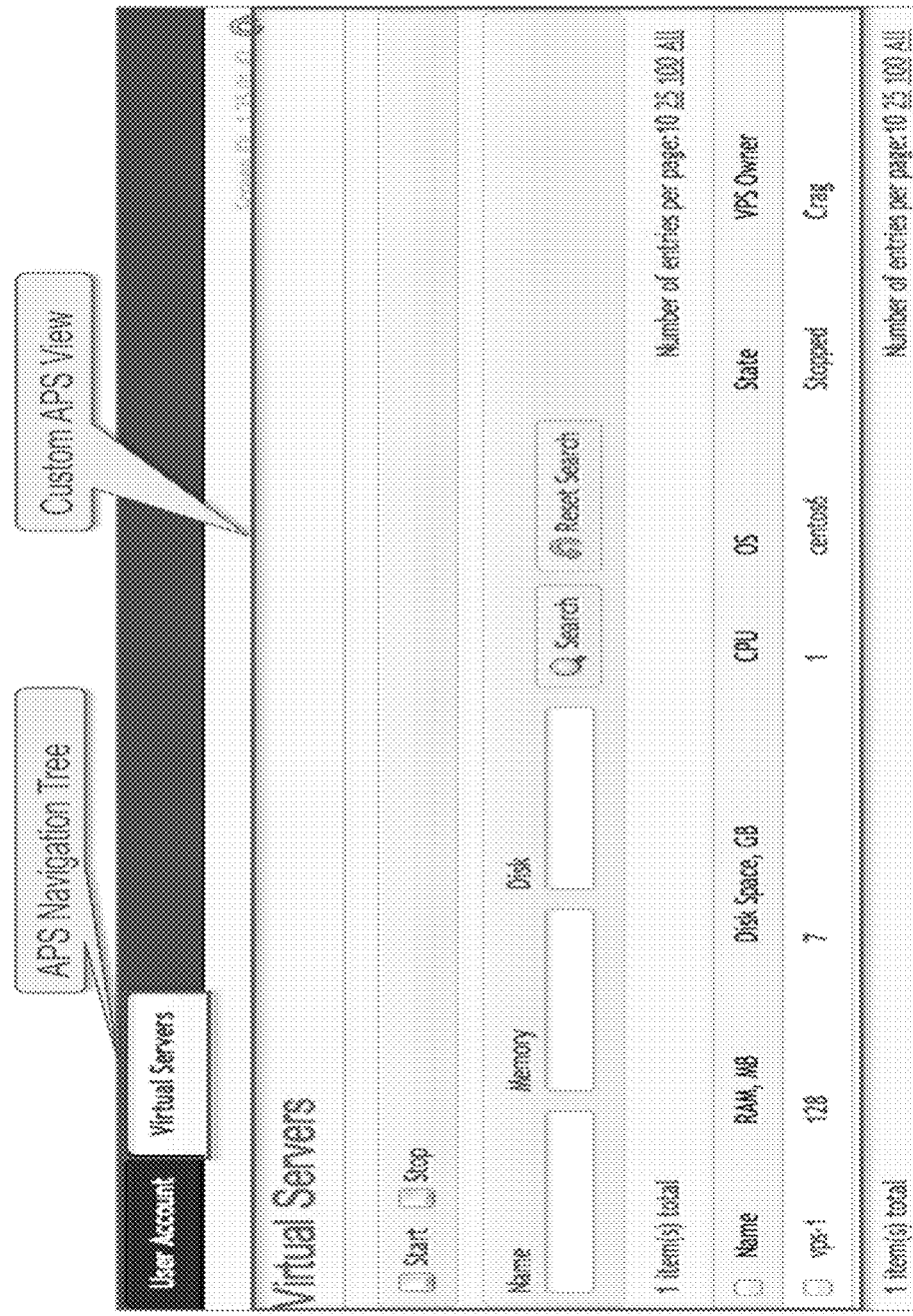
FIG. 11 shows the exemplary web-page with controls used for switching between the iframes.

FIG. 11 shows the exemplary web-page with controls used for switching between the iframes.

FIG. 12 describes secure relationships between active and passive content on the cloud remote from the user and user's browser. The APS controller shown in FIG. 12 stores settings and manages APS resources, in accordance with the resource types. Since all communications go through the APS controller (APSC), it keeps track of resources, types, and applications that manage those resources.

Objects managed by APS controller may be split into the collections, each with its own base path. Here UI navigation collection /aps/2/navigation may contain custom navigation tree for remote control panel and collection of data required for establishing the iframe. Another collection /aps/2/ui/runtime may contain data and procedures related to communication between applications which are protected from communication directly. An application is available for the APS controller usually through a single APS application HTTPS REST endpoint. In some cases, more endpoints can be used.

Each application service that is a factory of resources within a specific type is presented as a separate URI. In certain embodiments APS controller can operate an application instance, as a resource, through procedures similar to usual procedures with other resources, however, there are also several operations affecting the entire selected application instance.

As shown in FIG. 13, the APS applications can request the APS controller to operate resources in accordance with granted permissions. In the examples, the requester may be a user, however, an application instance can initiate similar operations as well.

An APS application can initiate operations over its own resources through the APS controller using application alias. The APS controller, as the service bus authority, interacts with other APS participants—application instances and users (through UI). These three types of actors authenticate (identify) themselves in the following way:

The APS controller uses own application client certificate when interacting with applications.

Each application instance uses own application client certificate when interacting with the APS controller.

The UI, when interacting with the APS controller, authenticates the active user by means of the user or account token. The received token allows the APS controller to further identify the actor—whether it is the provider, or a reseller, or a customer, or an end-user.

A token is generated for an account (e.g., a staff member) or an end user for a limited period of time and may be optionally refreshed while the owner of the token shows activity. In an exemplary embodiment, the token for the iframe has been invalidated after the iframe is closed. Here, the iframe may be active while refreshing or reloading web-pages containing the iframes. An application certificate is generated by the APS controller and passed to the application instance.

With reference to FIG. 14, an exemplary system for implementing the invention includes a general purpose computing device in the form of a computer system 20 or the like including a processing unit 21, a system memory 22, and a system bus 23 that couples various system components including the system memory to the processing unit 21.

The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system 26 (BIOS), containing the basic routines that help transfer information between elements within the computer 104, such as during start-up, is stored in ROM 24.

The computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM, DVD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the computer 20.

Although the exemplary environment described herein employs a hard disk, a removable magnetic disk 29 and a removable optical disk 31, it should be appreciated by those skilled in the art that other types of computer readable media that can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35. The computer 20 includes a file system 36 associated with or included within the operating system 35, one or more application programs 37, other program modules 38 and program data 39. A user may enter commands and information into the computer 20 through input devices such as a keyboard 40 and pointing device 42. Other input devices (not shown) may include a microphone, joystick, game pad, satellite dish, scanner or the like.

These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers.

The computer 20 may operate in a networked environment using logical connections to one or more remote computers 49. The remote computer (or computers) 49 may be another computer, a server, a router, a network PC, a peer device or other common network node, and typically includes many or all of the elements described above relative to the computer 20, although only a memory storage device 50 has been illustrated. The logical connections include a local area network (LAN) 51 and a wide area network (WAN) 52. Such networking environments are commonplace in offices, enterprise-wide computer networks, Intranets and the Internet.

When used in a LAN networking environment, the computer 20 is connected to the local network 51 through a network interface or adapter 53. When used in a WAN networking environment, the computer 20 typically includes a modem 54 or other means for establishing communications over the wide area network 52, such as the Internet.

The modem 54, which may be internal or external, is connected to the system bus 23 via the serial port interface 46. In a networked environment, program modules depicted relative to the computer 20, or portions thereof, may be stored in the remote memory storage device. It will be appreciated that the network connections shown are exemplary and other means of establishing a communications link between the computers may be used.

Having thus described a preferred embodiment, it should be apparent to those skilled in the art that certain advantages of the described method and apparatus have been achieved.

It should also be appreciated that various modifications, adaptations, and alternative embodiments thereof may be made within the scope and spirit of the present invention. The invention is further defined by the following claims.

What is claimed is:

1. A method for web-based management of user resources on a cloud, the method comprising:
   from a user's computer, accessing a control procedure of one subgroup of commonly managed subgroups of the user resources, wherein the control procedure resides on the cloud, and is visible with a unique domain ID for the subgroup,
   starting isolated windows for each domain ID, the isolated windows containing a graphical representation of local applications, and wherein applications of one window share data and are connected to the control procedure using the same domain ID; and
   managing the user resources through the control procedures,
   wherein only one of the isolated windows is activated at any one time, and
   wherein when the control procedure is controlled by multiple applications corresponding to separate windows, a separate communication channel with a separate domain ID is established for each window.

2. The method of claim 1, further comprising issuing security tokens, wherein objects grouped in the isolated window share the same token delivered separately to each object.

3. The method of claim 2, further comprising:
   generating the security token on the cloud;
   assigning the rights to the security token to control application resources for an associated account; and
   establishing trusted relationships between the applications.

4. The method of claim 1, wherein the control panel enables purchase and setup of virtual environments for other users, including purchase and setup of server resources and services.

5. The method of claim 4, wherein the virtual environments are purchased through a unified interface and utilizes a common Application Provisioning Standard object model for purchase and activation.

6. The method of claim 4, wherein any server applications running in any of the virtual environments utilize a common Application Provisioning Standard object model.

7. The method of claim 1, wherein the control procedures run in a virtual environment on the cloud.

8. The method of claim 1, wherein the accessing is performed using a dedicated communication channel.

9. The method of claim 1, wherein multiple domain IDs are used in one communication session between the cloud and the user's computer.

10. A system for managing web-based services, the system comprising:
    a client computer configured to interface to a plurality of groups of user resources on a cloud, the groups divided into subgroups of commonly managed resources and their settings, each subgroup having a control procedure and each subgroup using a unique domain ID,
    wherein multiple domain IDs are used in one communication session between the server and the user computer;
    on the client computer, opening a plurality of isolated windows for each domain ID, the isolated windows containing a graphical representation of local applications, and where the local applications share data and some of the local applications exchange commands with the control procedure; and
    wherein the user resources are controlled by the local applications, and
    wherein:
    only one of the isolated windows is activated at any one time; and
    when a control procedure is controlled by several local applications belonging to separate windows, a separate communication channel with a separate domain ID is established for each local application.

11. The system of claim 10, further comprising downloading a webpage to a browser on the client computer, the webpage including the isolated windows, each window managing browser objects and interfacing to the control procedures through a unified interface for managing server resources.

12. The system of claim 11, wherein one of the browser objects is a local computer application for managing the server resources, the server resources including server applications.

13. The system of claim 12, wherein the browser objects include a mail server interface and an antivirus interface.

14. The system of claim 10, wherein all web-based services from the cloud that are available to the user are controlled from a control panel in a browser, the control panel interfacing to the cloud through a dedicated communication channel.

15. The system of claim 10, wherein iframes corresponding to the isolated windows are isolated from each other with the domain name used as an ID for group of objects.

16. The system of claim 15, further comprising implementing data exchange between the iframes using communication interface implemented on a provider's server.

17. The system of claim 15, wherein a displayed size of the iframes is adjusted automatically based on content of the iframes without hiding any content of the iframe from a window corresponding to the iframe.

18. The system of claim 15, wherein each iframe has its own session with its own set of security rules that are defined by the control procedures.

19. The system of claim 15, wherein navigation between menu items in a webpage displayed in a browser is isolated from contents displayed in the iframes.

20. The method of claim 10, wherein a webpage displayed in a browser includes a plurality of iframes corresponding to the isolated windows, such that each iframe is associated with an applications running on a server, the applications having a corresponding browser object inside the iframe.

* * * * *